United States Patent
Pajona et al.

(10) Patent No.: US 10,224,626 B1
(45) Date of Patent: Mar. 5, 2019

(54) CO-LOCATED ACTIVE STEERING ANTENNAS CONFIGURED FOR BAND SWITCHING, IMPEDANCE MATCHING AND UNIT SELECTIVITY

(71) Applicant: ETHERTRONICS, INC., San Diego, CA (US)

(72) Inventors: Olivier Pajona, Nice (FR); Jaakko Kyllonen, Nice (FR); Laurent Desclos, San Diego, CA (US)

(73) Assignee: Ethertronics, Inc., San Diego, CA (US)

(*) Notice: Subject to any disclaimer, the term of this patent is extended or adjusted under 35 U.S.C. 154(b) by 0 days.

(21) Appl. No.: 15/218,982

(22) Filed: Jul. 25, 2016

Related U.S. Application Data (60) Provisional application No. 62/196,794, filed on Jul. 24, 2015.

(51) Int. Cl.
| | | |
|---|---|---|
| *H01Q 1/14* | (2006.01) | |
| *H01Q 3/24* | (2006.01) | |
| *H01Q 1/24* | (2006.01) | |
| *H01Q 3/36* | (2006.01) | |
| *H01Q 5/392* | (2015.01) | |
| *H01Q 7/00* | (2006.01) | |
| *H04B 7/0404* | (2017.01) | |
| *H01Q 5/335* | (2015.01) | |
| *H01Q 21/00* | (2006.01) | |
| *H01Q 1/48* | (2006.01) | |

(52) U.S. Cl.
CPC ............ *H01Q 3/24* (2013.01); *H01Q 1/245* (2013.01); *H01Q 1/48* (2013.01); *H01Q 3/36* (2013.01); *H01Q 5/335* (2015.01); *H01Q 5/392* (2015.01); *H01Q 7/00* (2013.01); *H01Q 21/00* (2013.01); *H04B 7/0404* (2013.01)

(58) Field of Classification Search
CPC .......... H01Q 1/243; H01Q 1/48; H01Q 21/28; H01Q 1/24
USPC .......................................................... 343/702
See application file for complete search history.

(56) References Cited

U.S. PATENT DOCUMENTS

| | | |
|---|---|---|
| 4,958,167 A | 9/1990 | Schroeder |
| 6,765,536 B2 | 7/2004 | Phillips et al. |
| 6,987,493 B2 | 1/2006 | Chen |
| 7,068,234 B2 | 6/2006 | Sievenpiper |
| 7,176,845 B2 | 2/2007 | Fabrega-Sanchez et al. |
| 7,180,467 B2 | 2/2007 | Fabrega-Sanchez et al. |
| 7,215,289 B2 | 5/2007 | Harano |
| 7,511,680 B2 | 3/2009 | Shtrom et al. |

(Continued)

*Primary Examiner* — Hai Tran
(74) *Attorney, Agent, or Firm* — Dority & Manning, P.A.

(57) ABSTRACT

An antenna system includes co-located active steering antennas implemented in a bottom portion of a wireless communication device designed for positioning near a user's mouth or chin. The co-located active steering antennas are each configured to steer a radiation pattern of the respective antenna, and can be further configured for active band switching and/or active impedance matching. These co-located active steering antennas can be used independently, or in a multi-input multi-output (MIMO) configuration. In addition, the antenna system is capable of antenna unit selectivity, which includes the ability to select one of the co-located antennas with the lowest head and hand loss for use, while disabling the antenna with the highest loss attributed to hand/head loading.

13 Claims, 11 Drawing Sheets

(56) References Cited

U.S. PATENT DOCUMENTS

| | | | |
|---|---|---|---|
| 7,830,320 B2 | 11/2010 | Shamblin et al. | |
| 7,911,402 B2 | 3/2011 | Rowson et al. | |
| 8,362,962 B2 | 1/2013 | Rowson et al. | |
| 8,446,318 B2 | 5/2013 | Ali et al. | |
| 8,515,496 B2* | 8/2013 | Cheng | H01Q 1/243 343/702 |
| 8,648,755 B2 | 2/2014 | Rowson et al. | |
| 8,717,241 B2 | 5/2014 | Shamblin et al. | |
| 9,065,496 B2 | 6/2015 | Rowson et al. | |
| 9,231,669 B2 | 1/2016 | Desclos et al. | |
| 9,240,634 B2 | 1/2016 | Rowson et al. | |
| 9,425,497 B2 | 8/2016 | Pajona et al. | |
| 9,439,151 B2 | 9/2016 | Zhu et al. | |
| 9,479,242 B2 | 10/2016 | Desclos et al. | |
| 9,590,703 B2 | 3/2017 | Desclos et al. | |
| 9,755,305 B2 | 9/2017 | Desclos et al. | |
| 9,755,580 B2 | 9/2017 | Desclos et al. | |
| 2013/0314297 A1* | 11/2013 | Hamabe | H01Q 21/28 343/893 |
| 2014/0097994 A1* | 4/2014 | Wong | H01Q 1/243 343/750 |
| 2014/0266922 A1* | 9/2014 | Jin | H01Q 21/28 343/702 |
| 2014/0266923 A1* | 9/2014 | Zhou | H01Q 5/35 343/702 |

* cited by examiner

| Tuner Mode | LB Band Covered | Load of the parasitic |
|---|---|---|
| 1 | LTE B12, B17 (698-746 MHz) | GND |
| 2 | LTE B13, B20 (746-862 MHz) | 18 pF |
| 3 | GSM 850 (824-894 MHz) | 10 pF |
| 4 | GSM 900 (880-960 MHz) | 5 pF |
| 5 | Additional Null Steering | 0.1 pF |
| 6 | Additional Null Steering | 4.3 nH // 4pF |
| 7 | Additional Null Steering | 12 pF serial with 5.1nH |

Modes 1-4: Band Switching modes
Modes 5-7: Active Steering modes

➤ The 1.7-2.17 GHz and the 2.5-2.7 GHz bands are covered in all tuning mode

FIG.11

CO-LOCATED ACTIVE STEERING ANTENNAS CONFIGURED FOR BAND SWITCHING, IMPEDANCE MATCHING AND UNIT SELECTIVITY

CROSS-REFERENCE TO RELATED APPLICATIONS

This application claims benefit of priority with U.S. Ser. No. 62/196,794, filed Jul. 24, 2016; the contents of which are hereby incorporated by reference.

BACKGROUND

Field of the Invention

This invention relates to antenna systems for wireless communication; and more particularly, to an antenna system including co-located active steering antennas configured for, null steering, band switching, impedance matching, and unit selectivity (swoop).

Description of the Related Art

With the advent of modern smart phone and similar wireless technologies, there is an ongoing need for antennas and antenna systems capable of providing improved connectivity and communication system performance.

Conventional passive antennas are currently being replaced with modern active antenna systems for use in modern wireless communication devices. Active antennas generally include active components, such as tunable capacitors, phase shifters, switches and the like. The active antenna system is generally capable of reconfiguring one or more of the active components to achieve a desired state or configuration of the active antenna.

Active antennas include any of: active band switching antennas configured to vary a frequency response of the antenna; active null steering antennas configured to vary a radiation pattern of the antenna for steering a radiation pattern null in an intended direction, for example, toward an interferer; active beam steering antennas, which are similar to null steering antennas, but configured to vary a radiation pattern of the antenna for steering a gain maxima in the direction of a base transceiver station, access point or other external transceiver; and active impedance matching antennas configured to vary a matching circuit for matching the antenna to the RF front end.

While active antennas are gaining popularity among wireless device manufacturers, there remain a number of problems for which improvement is continually desired. First, body loading effects on the antenna system generally cause the antenna to detune out of intended bands. Body loading can take the form of (i) "hand-loading", where the hand used to hold the phone forms a coupling with the antenna system of the device, causing the antenna to detune; or (ii) "head-loading", where the head of a user forms a coupling with the antenna system of the device causing the antenna to detune, among other device use-cases. In general, the degree of antenna system detuning increases with the proximity with and corresponding load induced by the user's body on the antenna system.

Active null steering antennas and active beam steering antennas, collectively referred to herein as "active steering antennas", are described in commonly owned U.S. Pat. No. 7,911,402; U.S. Pat. No. 8,362,962; U.S. Pat. No. 8,648,755; each titled "ANTENNA AND METHOD FOR STEERING ANTENNA BEAM DIRECTION"; the contents of which are hereby incorporated by reference.

Active band switching antennas are described in commonly owned U.S. Pat. No. 7,830,320; U.S. Pat. No. 8,077,116; and U.S. Pat. No. 8,717,241; each titled "ANTENNA WITH ACTIVE ELEMENTS"; the contents of which are hereby incorporated by reference.

Active impedance matching antennas are described in commonly owned US 2014/0306859, Published Oct. 16, 2014, and titled "ACTIVE ANTENNA ADATPRED FOR IMPEDANCE MATCHING AND BAND SWITCHING USING A SHARED COMPONENT"; the contents of which are hereby incorporated by reference.

Although the above referenced patents provide antennas having a significant advancement in the art, there remains a continued need for improved active antenna technologies. Moreover, as the wireless communications industry advances toward LTE-advanced carrier aggregation, there will be a need for antenna systems capable of servicing carrier aggregation requirements.

SUMMARY

A novel antenna system is proposed, the system includes co-located active steering antennas implemented in a bottom portion of a wireless communication device designed for positioning near a user's mouth or chin. The co-located active steering antennas are each configured to steer a radiation pattern of the respective antenna, and can be further configured for active band switching and/or active impedance matching. These co-located active steering antennas can be used independently, or in a multi-input multi-output (MIMO) configuration. In addition, the antenna system is capable of antenna unit selectivity, which includes the ability to select one of the co-located antennas with the lowest head and hand loss for use, while disabling the antenna with the highest loss attributed to hand/head loading. Other features and advantages will be apparent to those having skill in the art upon review of the appended detailed description and the accompanying drawings.

DETAILED DESCRIPTION

An antenna system includes co-located active steering antennas each being configured for radiation pattern steering, and further configured for one or more of: active band switching, active impedance matching, and unit selectivity (swoop). The term "swoop" is used to describe the ability to select one antenna, from a plurality antennas, that achieves an optimum characteristic, such as the lowest loss attributed to hand and head loading.

Active band switching provides the ability to vary one or more antenna characteristics to achieve frequency tuning, wherein the frequency response of the antenna is tuned to an intended resonance or band. In one example, an active tuning component, such as a tunable capacitor, tunable inductor, switch, or other active tuning component, is coupled to a parasitic conductor element of the antenna system. The parasitic element is positioned in proximity with an antenna radiating element and between the antenna radiating element and ground plane, resulting in a frequency coupling between the parasitic element and the radiating element. The active tuning component is adjusted to achieve a tuning state of the parasitic conductor element coupled therewith. By varying a tuning state of the active tuning component and parasitic conductor element combination, one or more resonances of the antenna can be adjusted.

Active null steering and active beam steering are accomplished in a similar manner but with one or more parasitic elements positioned outside of a volume created between the antenna radiating element and ground plane. The parasitic elements being positioned outside of the antenna volume provide an influence on the antenna radiation pattern resulting in a shift or rotation thereof; hence the active steering.

In certain embodiments, a plurality of parasitic conductor elements are positioned near the radiating element and each parasitic conductor element is coupled to an active tuning component for adjusting a tuning state thereof.

In other embodiments, a tuning module includes a plurality of active tuning components each with a distinct port, the module is then coupled to a plurality of parasitic elements with one parasitic coupled at each respective port, effectively providing a module with a plurality of active tuning components each being coupled to one of the plurality of parasitic elements.

One unique function of the antenna system includes an ability to tune the low frequency band independently from high bands. This ability to independently tune low frequency bands while preserving high bands is useful for servicing requirements of LTE advanced carrier integration.

Active impedance matching includes the use of active tuning components or active matching circuits for dynamically matching the antenna and the RF front end. In this regard, the power transfer between the RF front end and the antenna can be maximized. Control signals are communicated to the active tuning components or active matching circuits for tuning the impedance of the antenna system.

Unit selectivity is a technique wherein one of the co-located antennas is selected for operation based on hand/head loss characteristics. Since the antenna system includes co-located active steering antennas, each antenna will have an independent loading based on the orientation of the device against the user's hand/head, or the "use case" of the device. The system is configured to select one of the co-located antennas with the minimum hand/head loss for transmission/reception.

In the instant disclosure, an active antenna solution provides an antenna system configured to support one or more of: active steering, active band switching, active impedance matching, and active unit selectivity or "swoop". The antenna system includes co-located active steering antennas positioned on one side of a wireless communication device, preferably the bottom side.

In one embodiment, the primary functions of the antenna system include active band switching and active steering. Active band switching can provide independent low frequency band tuning while preserving the high bands for carrier aggregation. Active steering can provide multiple radiation patterns, and can be implemented with an algorithm for predictive modal cognitive diversity as disclosed in commonly owned US 2013/0189928, Published Jul. 25, 2013, and titled "MODAL COGNITIVE DIVERSITY FOR MOBILE COMMUNICATION MIMO SYSTEMS"; and US 2014/0162566, Published Jun. 12, 2014, and titled "MODAL COGNITIVE DIVERSITY FOR MOBILE COMMUNICATION SYSTEMS"; the contents of each of which are hereby incorporated by reference.

In other embodiments, one or both of active impedance matching and swoop technologies can be further implemented. Active impedance matching can be provided to maximize power transfer between the RF front end and the antenna. Swoop technology utilizes the bottom portion co-located antennas for minimizing the head and hand losses.

Figure 1:
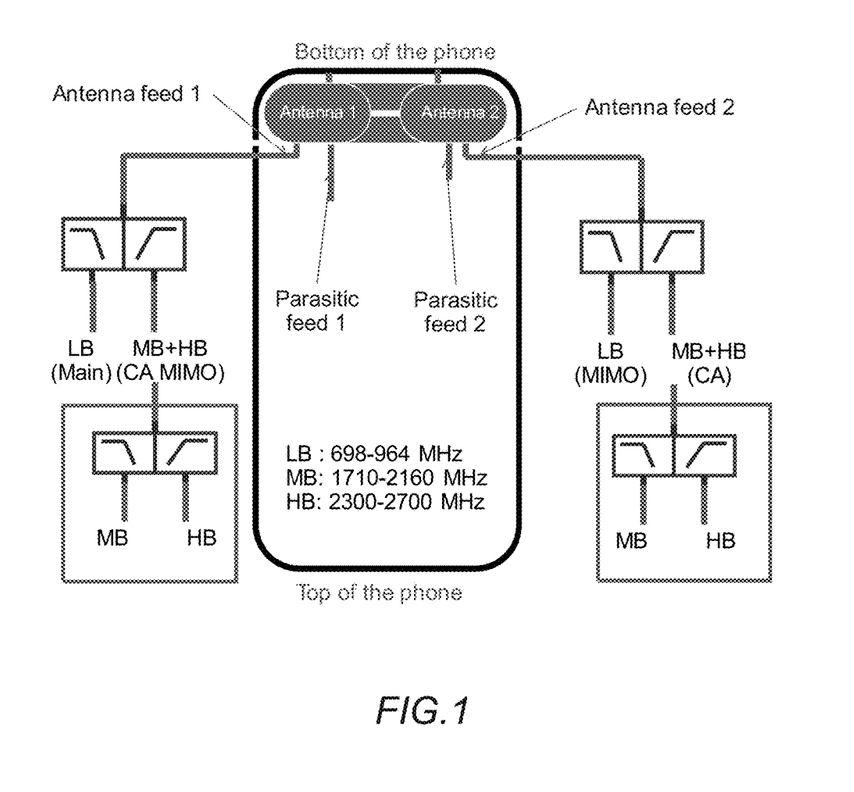
FIG. 1 shows a wireless communication device oriented upside-down; the device includes co-located active steering antennas positioned near a bottom portion of the device, the antennas are configured for servicing LTE-advanced carrier aggregation requirements.

Furthermore, the antennas can be configured with multiple band resonances in consideration of LTE-advanced carrier aggregation requirements. In carrier aggregation two or more carriers, meaning frequency band can be aggregated in order to enlarge the overall available bandwidth for the services. These frequency bands can be combined in various ways such as intraband contiguous, intraband non-contiguous and interband aggregation. Interband carrier aggregation has led to a high amount of different band combinations that are in demand by network operators worldwide based on the frequency blocks they are licensing. It is therefore required for an active multi band antenna system when being combined with a tuner to be able to actively tune one frequency band, such as the Low frequency band, without affecting other bands such as Mid or High bands, in order to maintain the carrier aggregation capability. This capability is supported by the antenna system described herein Now turning to the drawings, FIG. 1 shows a wireless communication device oriented upside-down; the device includes co-located active steering antennas (Antenna1; Antenna 2) positioned near a bottom portion of the device. Each of the antennas comprises an active steering antenna having a radiating element and one or more parasitic elements positioned adjacent to the radiating element. Each antenna has a parasitic feed (Parasitic feed 1; Parasitic feed 2) and an antenna feed (Antenna feed 1; Antenna feed 2), respectively. The feeds are coupled to various RF inputs as shown. The antennas are capable of low band (LB) resonances, for example 698 MHz-964 MHz, mid band (MB) resonances, for example 1720 MHz-2160 MHz, and high band (HB) resonances, for example 2300 MHz-2700 MHz, and is therefore compatible with LTE-advanced carrier aggregation requirements.

Figure 2:
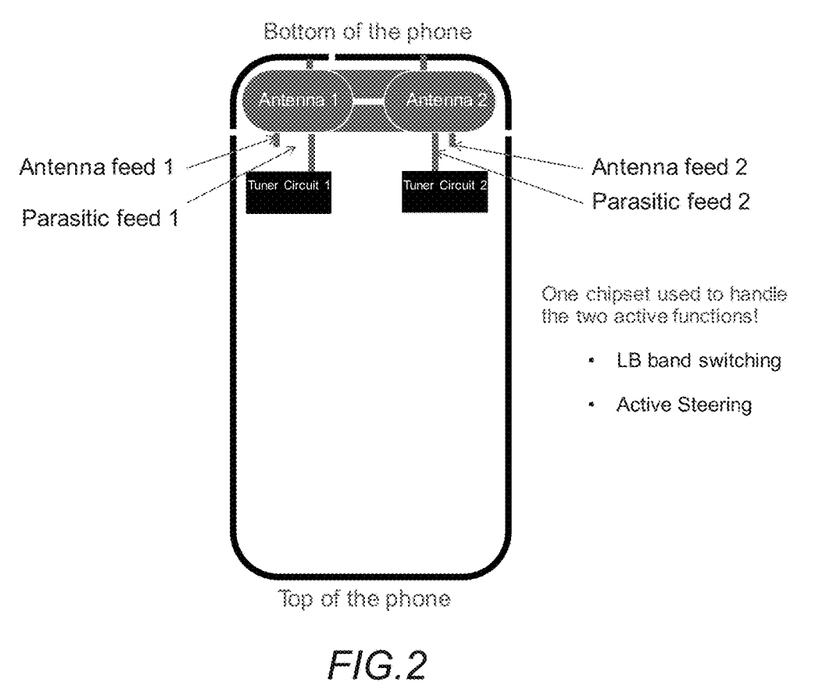
FIG. 2 shows a wireless communication device oriented upside-down; the device includes co-located active steering antennas positioned near a bottom portion of the device, the antennas are coupled to tuning circuits for providing active band switching and active steering.

FIG. 2 shows a wireless communication device oriented upside-down; the device includes co-located active steering antennas (Antenna 1; Antenna 2) positioned near a bottom portion of the device, the parasitic elements of the co-located antennas are coupled to tuning circuits (Tuner Circuit 1; Tuner Circuit 2, respectively) at the parasitic feeds (Parasitic feed 1; Parasitic feed 2) for providing active band switching and active steering. Each tuning circuit includes a single chipset module for providing each of the active low band switching and active steering. The antenna provides a parasitic conductor element that is configured to adjust the low band (LB) response of the antenna while preserving the high band (HB) response.

Figure 3:
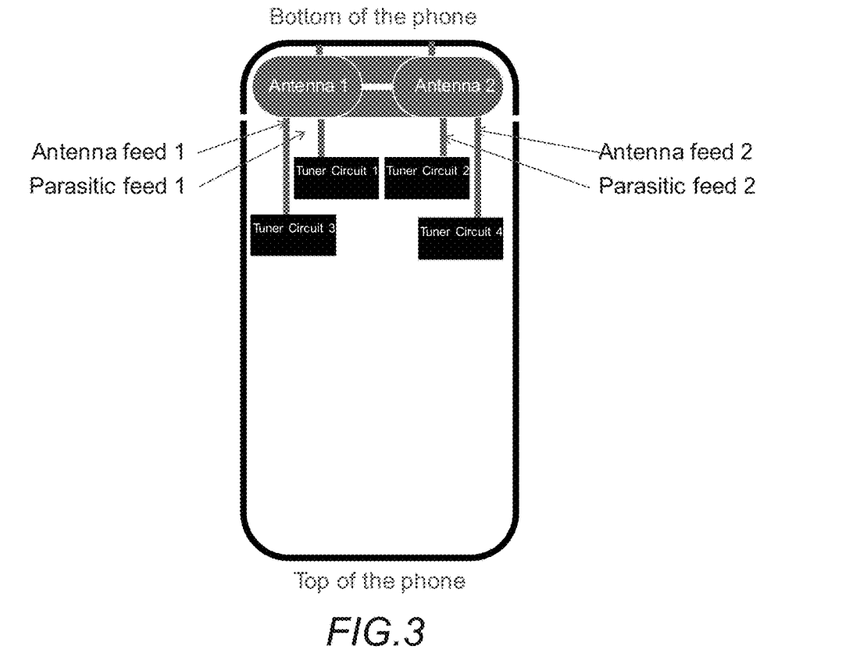
FIG. 3 shows a wireless communication device oriented upside-down; the device includes co-located active steering antennas positioned near a bottom portion of the device, the antennas are coupled to tuning circuits for providing active band switching and active steering, and the antennas are further coupled to impedance matching circuits for matching the antenna with the RF front end.

FIG. 3 shows a wireless communication device oriented upside-down; the device includes co-located active steering antennas (Antenna 1; Antenna 2) positioned near a bottom portion of the device, the parasitic elements of the antennas are coupled to tuning circuits (Tuner Circuit 1; Tuner Circuit 2, respectively) at the parasitic feeds (Parasitic feed 1; Parasitic feed 2) for providing active band switching and active steering, and the antennas are coupled to impedance matching circuits (Tuner Circuit 3; Tuner Circuit 4, respectively) for matching the antenna with the RF front end. The impedance matching circuits can be used to improve the impedance matching between the front end and the antenna, maximizing the power transferred to the antenna (or received from the antenna when the antenna is detuned by its environment; Hand, head, etc . . . ).

Figure 4:
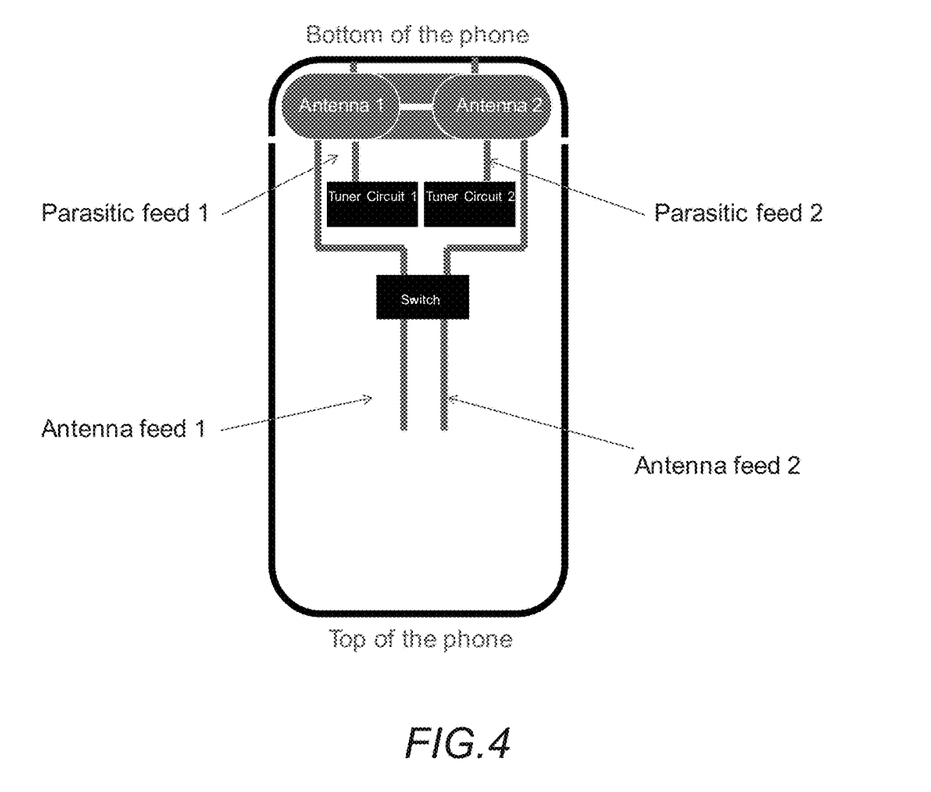
FIG. 4 shows a wireless communication device oriented upside-down; the device includes co-located active steering antennas positioned near a bottom portion of the device, the antennas are coupled to tuning circuits and configured for active band switching and active steering, and the antennas are further coupled to a switch configured to provide active unit selectivity (swoop).

FIG. 4 shows a wireless communication device oriented upside-down; the device includes co-located active steering antennas (Antenna 1; Antenna 2) positioned near a bottom portion of the device, the parasitic elements of the antennas are coupled to tuning circuits (Tuner Circuit 1; Tuner Circuit 2, respectively) at the parasitic feeds (Parasitic feed 1; Parasitic feed 2) for active band switching and active steering, and the antennas are further coupled to a switch (Switch) at the antenna feeds (Antenna feed 1; Antenna feed 2) configured to provide active unit selectivity, or "swoop". The switch can comprise a double-pole, double-throw (DPDT) switch, or any other similar switch or switching circuit.

Figure 5:
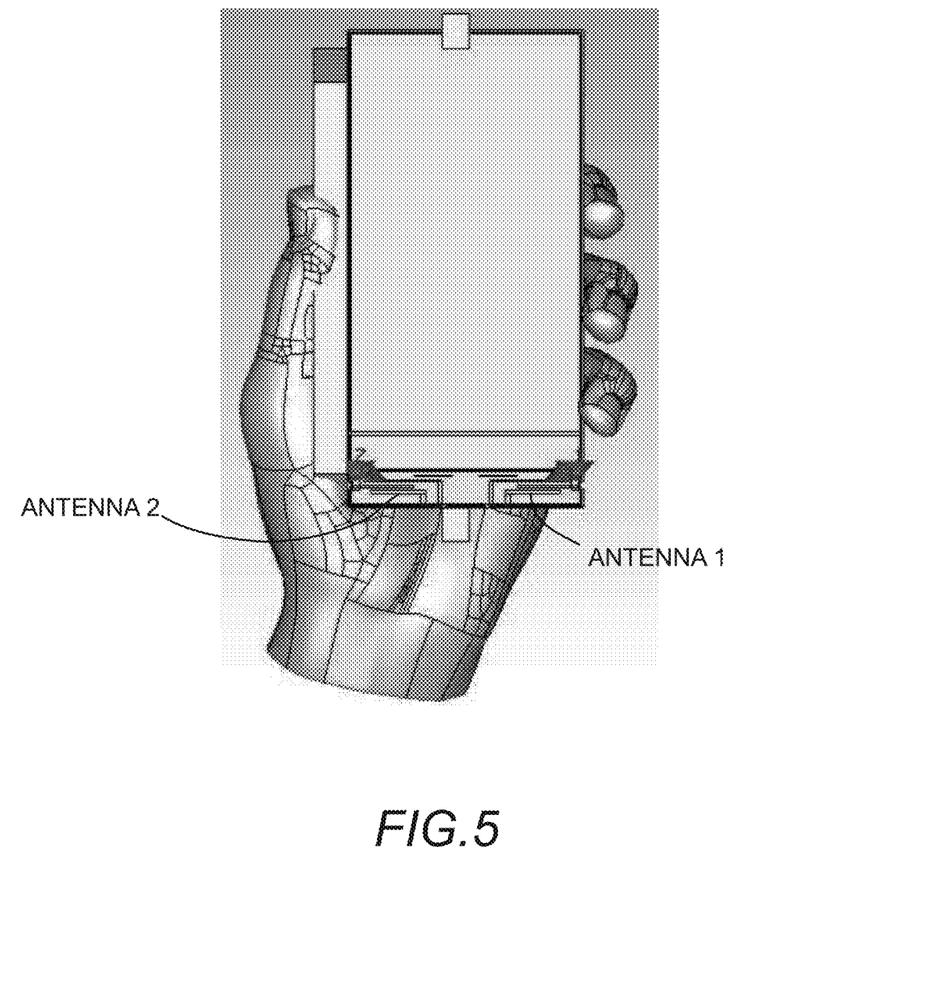
FIG. 5 shows a wireless communication device with co-located active steering antennas positioned near a bottom portion of the device, and further illustrates hand loss attributed to the device in the left-hand-held use case.

FIG. 5 shows a wireless communication device with co-located active steering antennas positioned near a bottom portion of the device, and further illustrates the problem of hand loss attributed to the device in the left-hand-held use case. Antenna 1 and Antenna 2 will experience distinct loading from the left hand as shown. Consider the device held in a right hand of a user, the loading would be differentiated from the illustrated example. Furthermore, whether the device is held against a right-side or left-side of a user's head will impact the loading on each of the antennas. The active unit selectivity, or "swoop" technology, provides a mechanism for sampling the detuning effects from the use-case of the device and to reconfigure the antenna system to utilize one of the antennas having less loss attributed to hand and head loading as the primary antenna of the device. As the use case changes, for example the phone is changed from left-hand-held to right-hand-held, the antenna system can utilize the swoop technology to reconfigure to select the optimal primary antenna. This can be achieved by comparing the SINR between the two antennas, or using any other sensor/accelerometer to detect the way the user is using the phone. Moreover, the antenna having the more important free space can help to reduce the head and/or hand losses coming from the tissue absorption.

Figure 6:
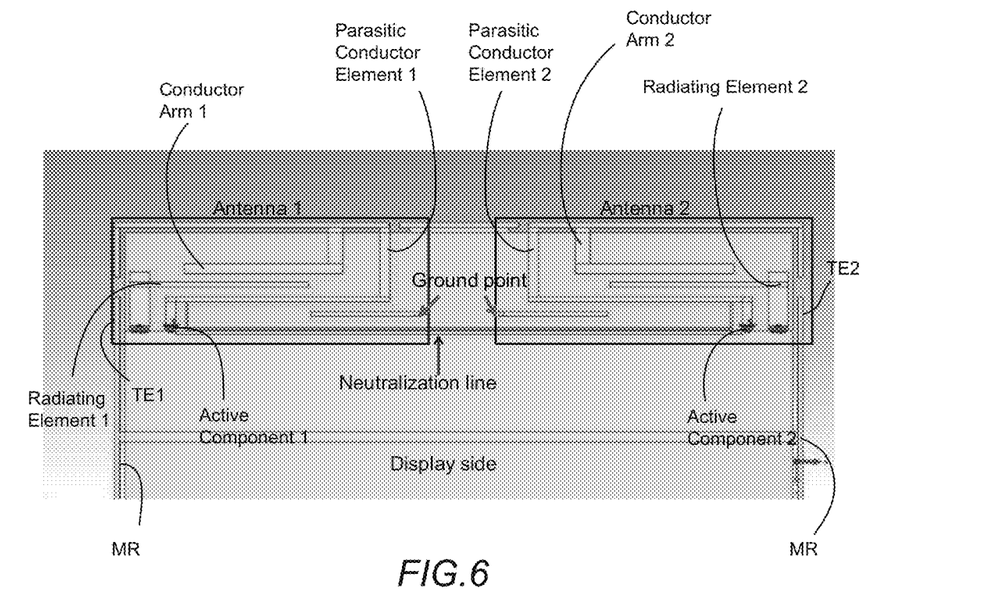
FIG. 6 shows an example of antenna structures of the co-located antennas in accordance with an embodiment.

FIG. 6 shows an example of antenna structures of the co-located antennas in accordance with an embodiment. In the illustrated example, the first antenna (Antenna 1) includes a radiating element (Radiating Element 1) with an antenna feed port, and a parasitic conductor element (Parasitic Conductor Element1) coupled to an active component (Active Component 1). The parasitic conductor element forms an annular structure around the radiating element and further includes a resonant portion (Conductor Arm 1) disposed adjacent to the antenna radiator as-illustrated. The second antenna (Antenna 2) is similar to the first antenna but a mirror opposite. The second antenna (Antenna 2) includes a second radiating element (Radiating Element 2), a second resonant portion (Conductor Arm 2), and a second parasitic conductor element (Parasitic Conductor Element 2). A metal ring (MR) surrounds the device. A first terminal end (TE1) of the metal ring is disposed adjacent to the first antenna radiating element (Radiating Element 1). A second terminal end (TE2) of the metal ring is disposed adjacent to the second antenna radiating element (Radiating Element 2). The terminal ends of the metal ring are each disposed adjacent to one of the parasitic elements, forming a pair of side-slots, one on each side of the device. A neutralization line extends beneath the first and second antennas. Ground points are further indicated in the illustration. Although FIG. 6 shows an illustrative example of the co-located antennas for use with the invention, the illustrated structure can be modified in various ways to configure the antenna response. Thus, this invention is not limited to the illustrated structure and such is being provided only for illustrative purposes.

Figure 7:
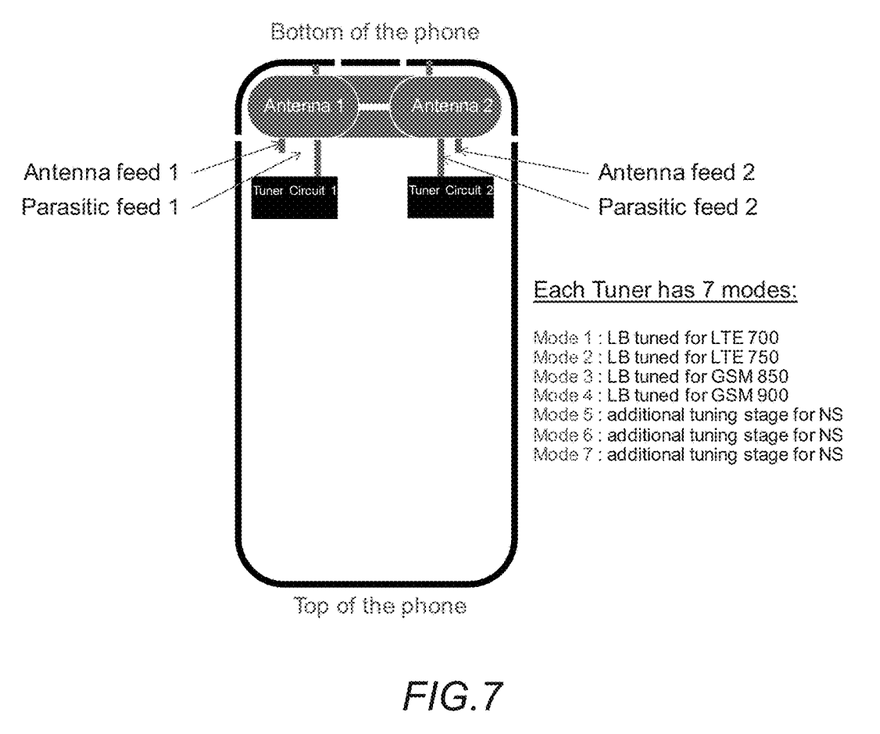
FIG. 7 shows an example implementation of the antenna system having co-located active steering antennas, and the respective antenna modes for each tuner of the antenna system.

FIG. 7 shows an example implementation of the antenna system having co-located active steering antennas, and the respective antenna modes for each tuner of the antenna system. A first active steering antenna (Antenna 1) comprises a first antenna feed (Antenna feed 1) and a first parasitic feed (Parasitic feed 1). A second active steering antenna (Antenna 2) comprises a second antenna feed (Antenna feed 2) and a second parasitic feed (Parasitic feed 2). Each of the co-located active steering antennas is positioned near a bottom of the device. A first tuning circuit (Tuner Circuit 1), or module, is coupled to the first parasitic feed. A second tuning circuit (Tuner Circuit 2), or module, is coupled to the second parasitic feed. Each tuning circuit, or module, is configured to provide at least seven unique modes as-illustrated. In each mode the low band is tuned to a desired resonance, or an active steering is implemented.

Figure 8:
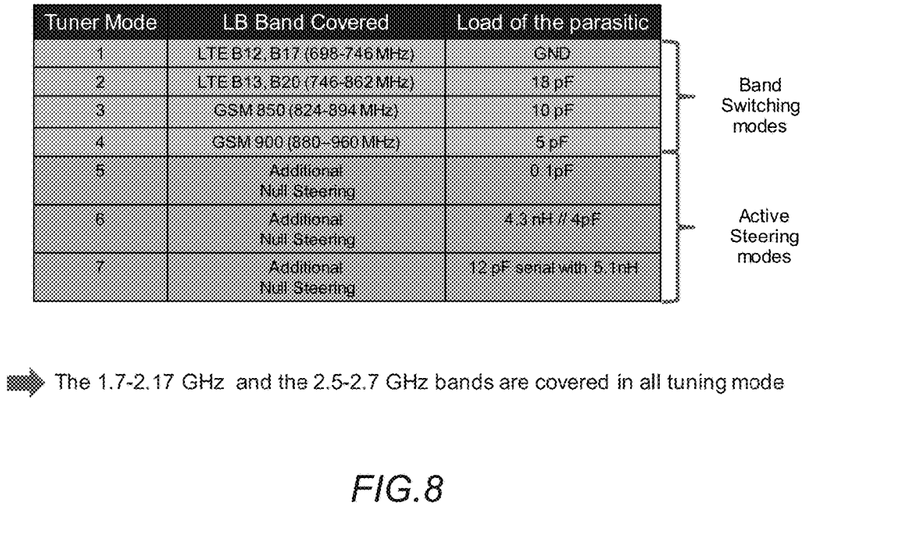
FIG. 8 shows a table illustrating the various tuning module modes, frequency bands achieved, and the corresponding active load on the parasitic element of the respective antenna coupled to the tuning module.

FIG. 8 shows a table illustrating the various tuning module modes (Tuner Mode 1 thru 7), frequency bands achieved (LB Band Covered), and the corresponding active load on the parasitic element (Load of the parasitic) of the respective antenna coupled to the tuning module. The table illustrates a plurality of band switching modes and a plurality of active steering modes (null/beam steering). For each mode a tuning state of the active tuning components of the module is indicated (for example, GND or 18 pF), and a corresponding band is the result of the antenna when the active tuning component is configured in each tuning state. Also indicated is that the 1.7 GHZ-2.17 GHZ and the 2.5 GHz-2.7 GHz bands (MB and HB) are covered in all tuning modes. Depending of the antenna design, also other load types than capacitance and ground connection, such as inductance and open circuit, or the combinations of both or all of them can be used for the band switching purpose.

Figure 9:
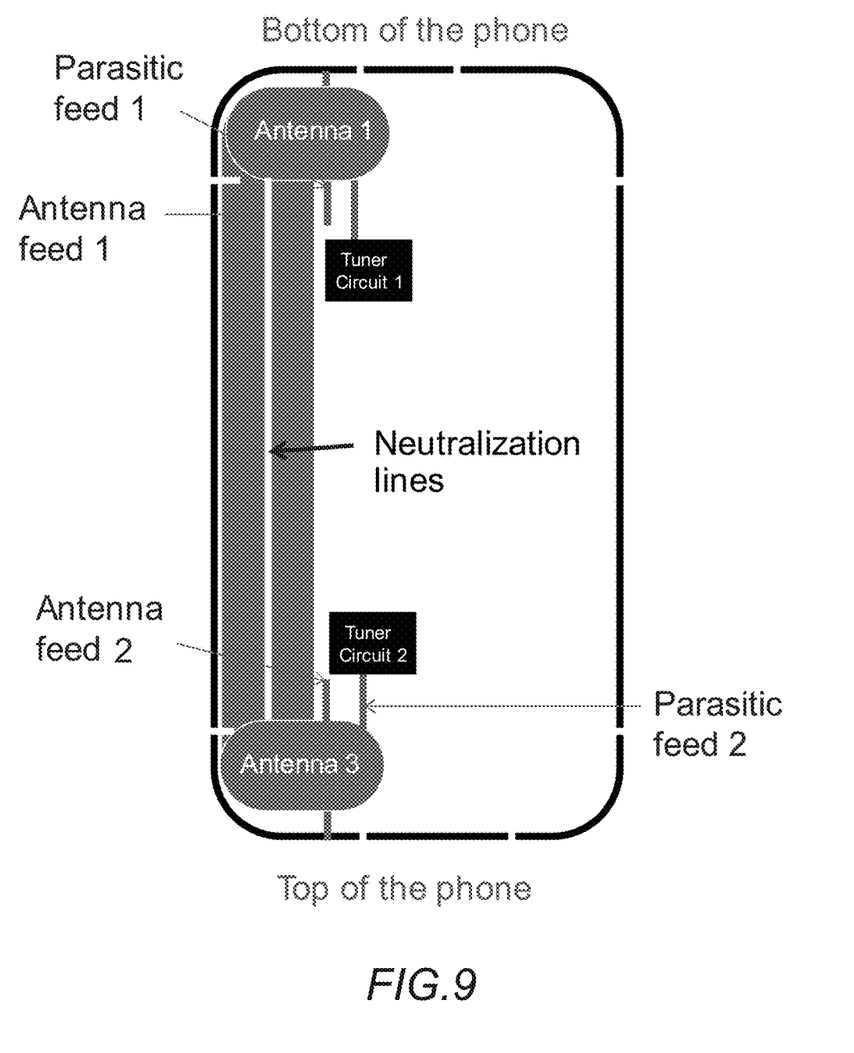
FIG. 9 shows an example implementation of the antenna system having co-located active steering antennas in accordance with another embodiment.

FIG. 9 shows an example implementation of the antenna system having co-located active steering antennas in accordance with another embodiment. Here, a first antenna (Antenna 1) is positioned near a bottom of the phone and to a first side (left side considering the orientation of the phone as depicted). A second antenna (Antenna 3) is positioned near the top of the phone and also to the first side. A first tuning circuit (Tuner Circuit 1) is coupled to the first antenna at a first parasitic feed thereof (Parasitic Feed 1), and Tuner Circuit 2 is coupled to the second antenna at the second parasitic feed (Parasitic Feed 2). The first and second antennas are shown having respective antenna feeds (Antenna feed 1; Antenna feed). Note that the co-located antennas can be positioned on a common side along a length of the wireless device, in contrast to the previous embodiment of FIG. 7 where the antennas are shown being co-located at a bottom of the device.

Figure 10:
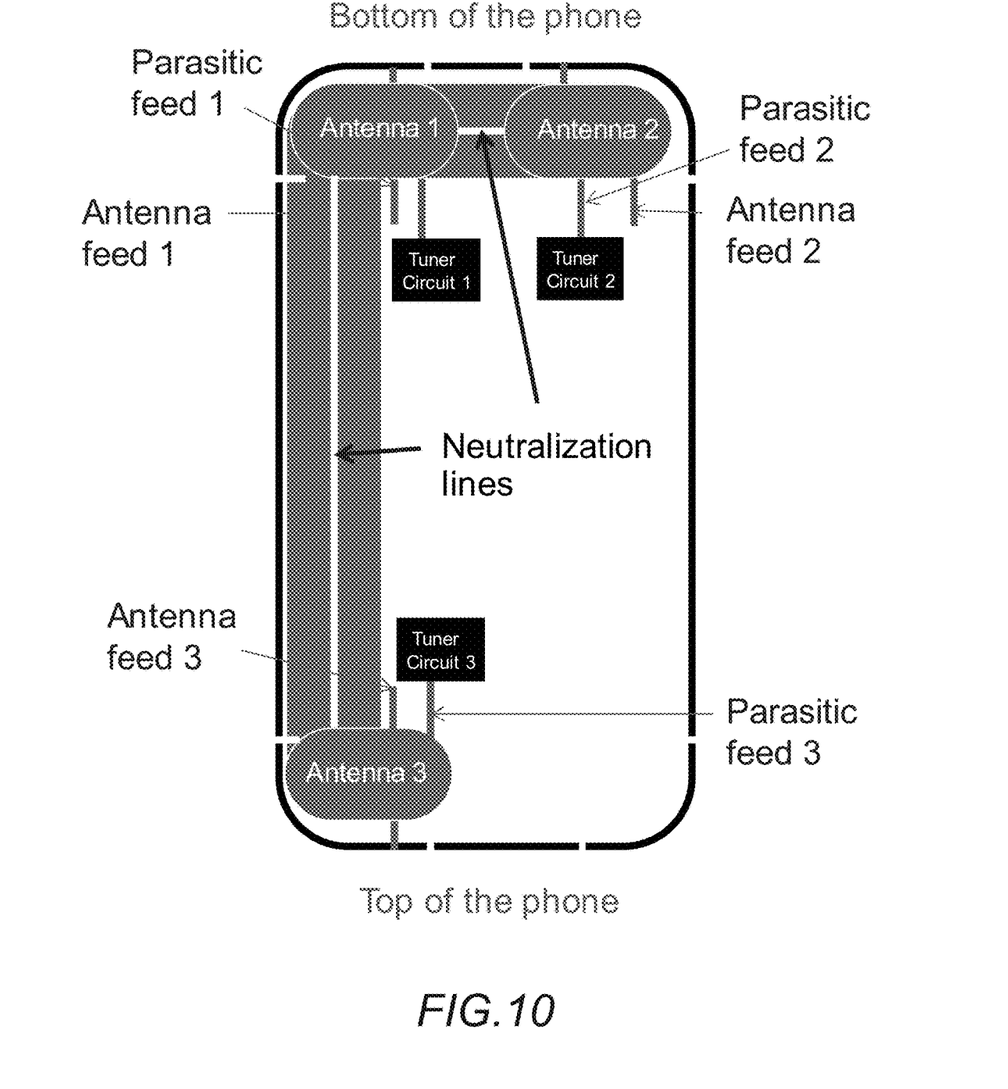
FIG. 10 shows an example implementation of the antenna system having co-located active steering antennas in accordance with yet another embodiment.

FIG. 10 shows an example implementation of the antenna system having co-located active steering antennas in accordance with yet another embodiment. Here, three antennas are illustrated, two of the antennas (Antenna 1; Antenna2) are co-located at a bottom side of the device. In addition, two of the antennas (Antenna 1; Antenna 3) are co-located at a side of the device along a length thereof. Each antenna is shown with a distinct antenna fee (Antenna feed 1; Antenna feed 2; Antenna feed 3); a distinct parasitic feed (Parasitic feed 1; Parasitic feed 2; Parasitic feed 3); and a distinct tuning circuit (Tuner Circuit 1; Tuner Circuit 2; Tuner Circuit 3).

Figure 11:
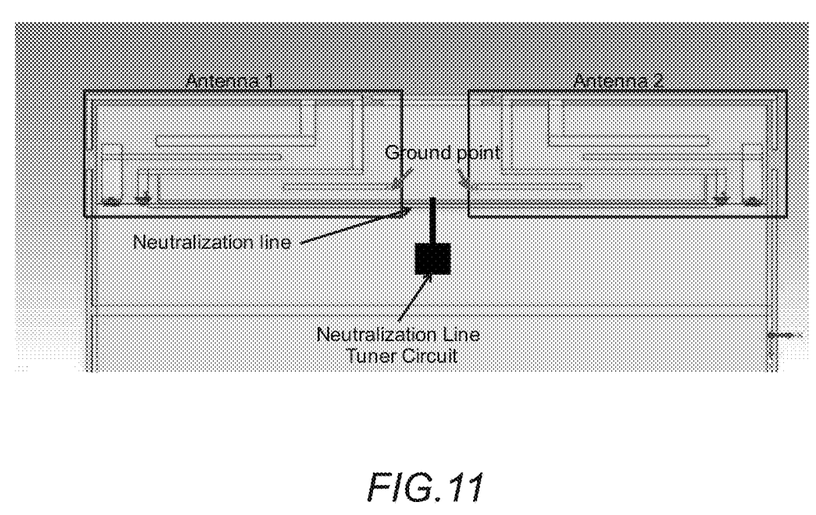
FIG. 11 shows an example of antenna structures of the co-located antennas in accordance with another embodiment.

FIG. 11 shows an example of antenna structures of the co-located antennas in accordance with another embodiment. Here, a tuner circuit is coupled to the neutralization line as shown.

Accordingly, co-located active steering antennas can be implemented in the bottom portion, or a side portion, of a wireless communication device to provide up to several functions, such as active steering, active band switching, active impedance matching, and active unit selectivity (swoop).

What is claimed is:

1. In a wireless communication device having a top portion and a bottom portion wherein the bottom portion is configured to be positioned near a mouth or cheek of a user, an antenna system comprising:
a first active steering antenna configured for band switching and radiation pattern steering;
a second active steering antenna configured for band switching and radiation pattern steering;
a metal ring configured about a perimeter of the device and having a first terminal end and a second terminal end, each of the first and second terminal ends positioned adjacent to one of the first and second antennas, respectively;
wherein the first and second active antennas are co-located at the bottom portion of the device;
wherein each of the first and second active steering antennas is connected by a neutralization line; and
wherein the neutralization line is connected to a control circuit operable to dynamically adjust a characteristic of the neutralization line based on a frequency band selected and an antenna environment of the antenna system.

2. The antenna system of claim 1, wherein the first active steering antenna comprises:
a first radiating element having a first antenna feed associated therewith;
a first parasitic element positioned adjacent to the first radiating element, the first parasitic element having a first parasitic feed associated therewith;
the first parasitic feed further coupled to a first active tuning component.

3. The antenna system of claim 2, wherein the first active tuning component is one of: a switch, tunable capacitor, tunable inductor or tunable phase shifter.

4. The antenna system of claim 2, wherein the first active tuning component is housed in a first tuning module containing a plurality of active tuning components.

5. The antenna system of claim 2, wherein the second active steering antenna comprises:
a second radiating element having a second antenna feed associated therewith;
a second parasitic element positioned adjacent to the second radiating element, the second parasitic element having a second parasitic feed associated therewith;
the second parasitic feed further coupled to a second active tuning component.

6. The antenna system of claim 5, wherein the second active tuning component is housed in a second tuning module containing a plurality of active tuning components.

7. The antenna system of claim 1, wherein each of the first and second active steering antennas is configured for low frequency band switching without changing mid-band and high-band resonances.

8. The antenna system of claim 1, wherein at least one of the first and second active steering antenna feeds is coupled to a matching circuit for matching the respective antenna with an RF front end.

9. The antenna system of claim 1, wherein each of said first and second antenna feeds is coupled to a switch, wherein the antenna system is configured to select one of the first and second antennas having the lowest hand and head loss to be used as a primary antenna of the antenna system.

10. The antenna system of claim 1, comprising three or more active steering antennas; each active steering antenna configured for band switching and radiation pattern steering.

11. The antenna system of claim 10, wherein at least two of the three or more active steering antennas are co-located on a common side of the device, and wherein each of the three or more active steering antennas is connected by the neutralization line.

12. The antenna system of claim 10, wherein at least one of the three or more active steering antennas is not co-located with another of the active steering antennas, and wherein each of the three or more active steering antennas is connected by the neutralization line.

13. An antenna system comprising a pair of co-located active steering antennas positioned at a bottom end of a wireless communication device and configured for one or more of: active steering, active band switching, active impedance matching, and active unit selectivity; wherein each of the pair of co-located active steering antennas is connected by a neutralization line; and wherein the neutralization line is connected to a control circuit operable to dynamically adjust a characteristic of the neutralization line based on a frequency band selected and an antenna environment of the antenna system.

* * * * *